PHONOGRAPH TONE ARM SUPPORT

Original Filed Feb. 24, 1964 2 Sheets-Sheet 1

INVENTOR.
WILLARD J. FAULKNER
BY J. D. Douglas
HIS ATTORNEY

PHONOGRAPH TONE ARM SUPPORT

Original Filed Feb. 24, 1964

INVENTOR
WILLARD J. FAULKNER
BY
J. D. Douglas
His ATTORNEY 3,402,936

PHONOGRAPH TONE ARM SUPPORT

Willard J. Faulkner, Glen Ellen, Ill., assignor to Karl W. Jensen, La Grange, Ill.

Original application Feb. 24, 1964, Ser. No. 346,602, now Patent No. 3,304,092, dated Feb. 14, 1967. Divided and this application Dec. 20, 1966, Ser. No. 627,567
3 Claims. (Cl. 274—23)

ABSTRACT OF THE DISCLOSURE

A phonograph tone support includes a shaft having a base with a pair of spaced apart projections. The tone arm has a base with a pair of flanges in spaced relation to the projections. A pivot pin rigidly carried by one of the flanges extends loosely through one of said projections and a screw tightly threaded in the other flange of the tone arm is loosely threaded through the other of said projections on the base. In addition, a base member on the shaft is formed with a pair of shoulders on opposite sides and a headed pin extends upward through a triangular opening in a base plate with a spring forcing the base plate against the pin whereby the base plate may be moved in relation to the base member.

This invention relates to phonograph record changers and more particularly to tone arm supports. It is a division of my parent application which resulted in Patent No. 3,304,092.

A feature of the invention resides in an improved mounting for the tone arm which reduces friction to a minimum and enables a much lighter needle or stylus pressure to be realized, thus extending the life of the records.

Another feature of the tone arm resides in the fact that the mounting is such that interference with the tone arm during a record change cycle does not cause misadjustment or breakage thereof.

Still other advantages of the invention and the invention itself will become more apparent from the following description of an embodiment thereof, which is illustrated by the accompanying drawings and forms a part of this specification.

Figures 1, 2:
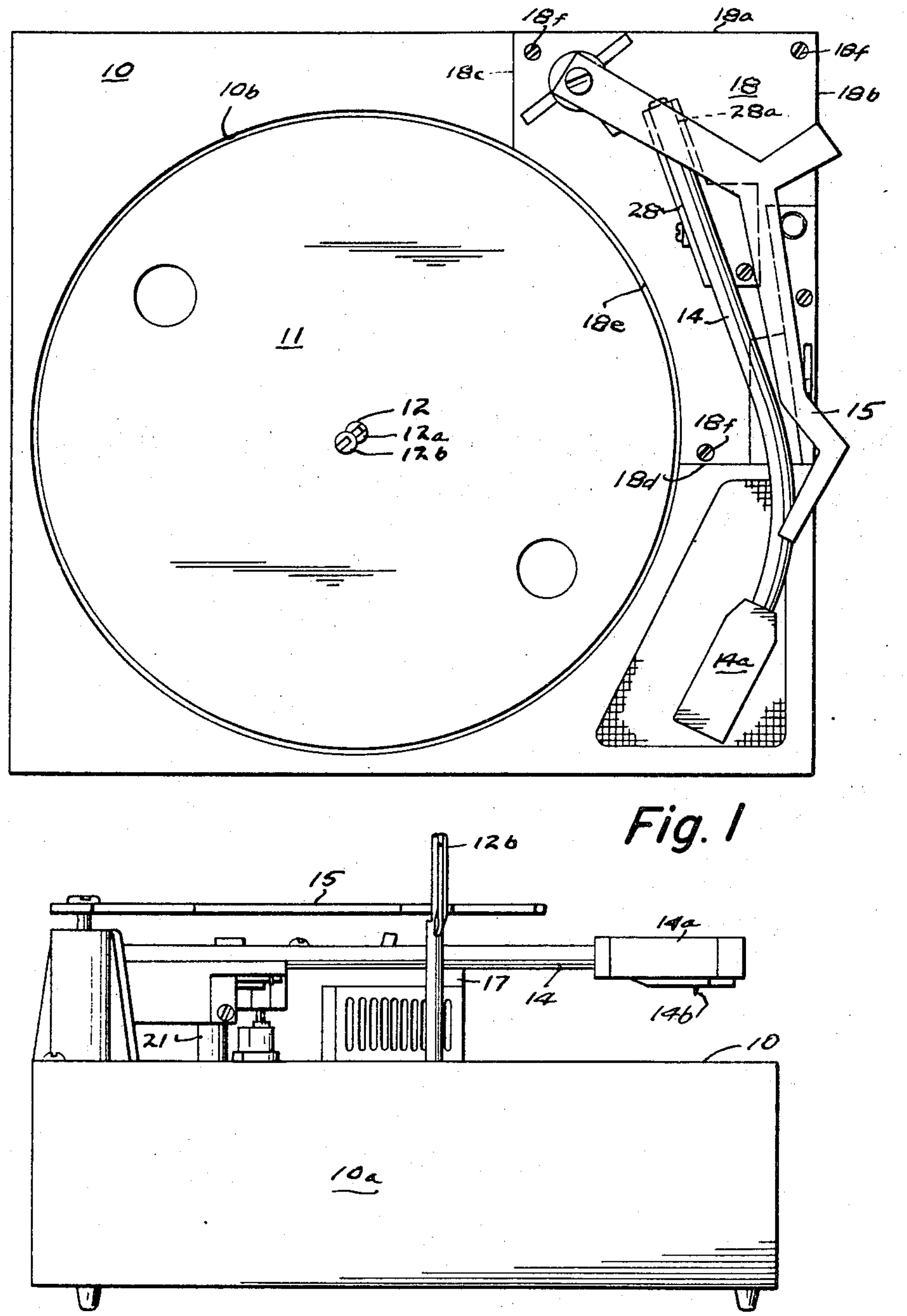
FIG. 1 is a plan view of a record changer of this invention, with the mechanism in an "off" position.
FIG. 2 is a side elevational view of the record changer of FIG. 1.
Figures 3, 4, 5:
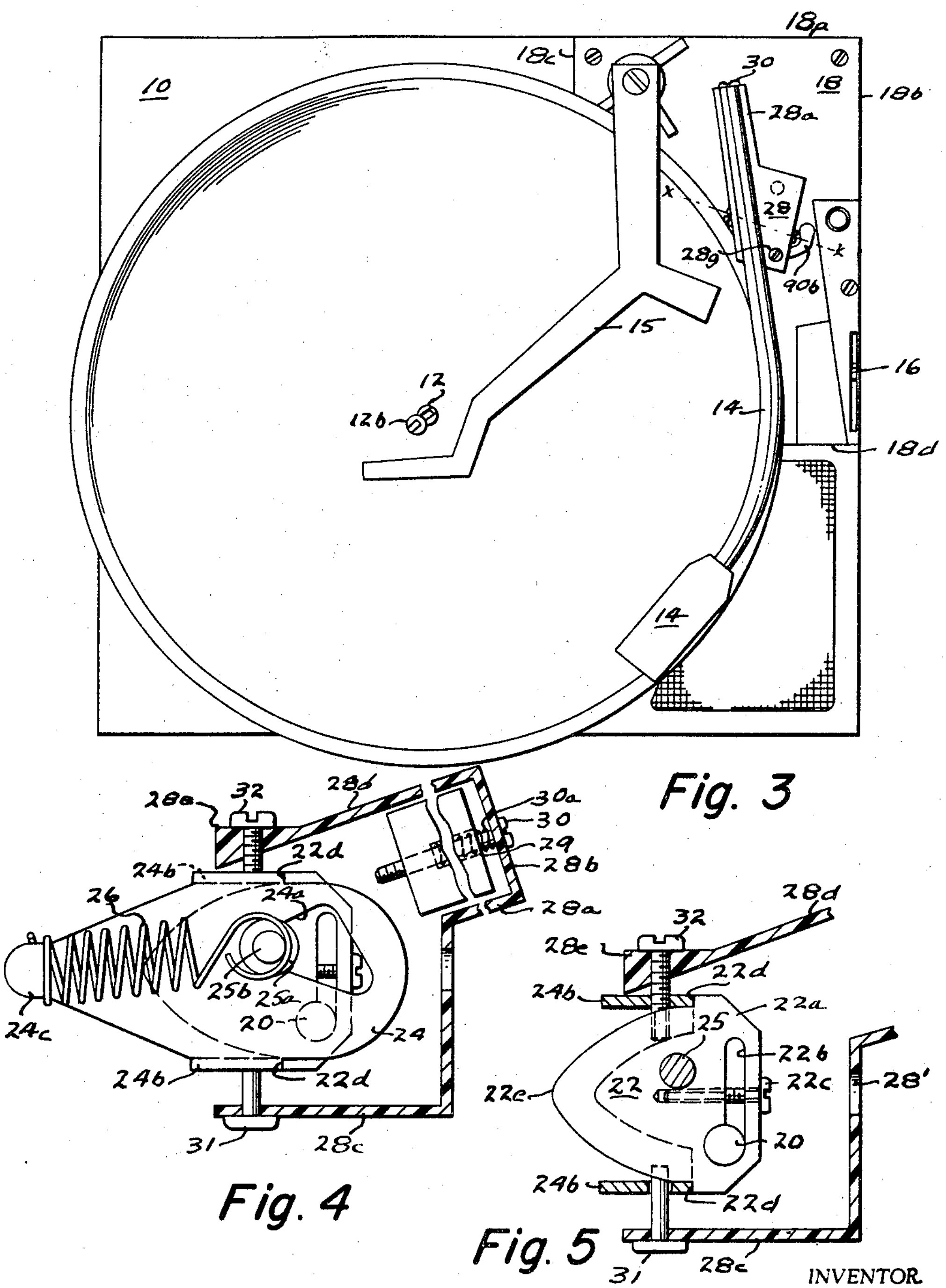
FIG. 3 is a plan view with the mechanism in the "on" position at the start of the playing of a record.
FIG. 4 is an enlarged fragmentary plan view of the tone arm top support with the tone arm shown broken away and shown in fragment.
FIG. 5 is a similar plan view of the tone base support.

Referring now to the drawings, throughout which like parts have been designated by like reference characters, and more particularly as can best be seen from FIGS. 1 to 3 inclusive, exteriorly the changer is depicted as including a base having an upper surface 10 and downwardly extending side walls **10*a*. The upper side is provided with a downwardly extending circular well 10*b* in which a turntable 11 is disposed. A spindle 12 extends upwardly from the center of the turntable, and has the usual offset record stack holding part 12*b* and a record supporting shoulder 12*a***.

On the top of the base and to one side of the turntable, there is provided a removable cover plate housing 18, the adjacent edges **18*a*–18*b* of which define the upper right corner and the edges 18*c* and 18*d* the two extremities and which extremities are joined together by a curved edge 18*e* which follows the contour of the turntable 11. The base is held in position by screws 18*f* which extend through the plate and are threaded into bosses, not shown, on the side walls 10*a*. A tone arm 14 and adjacent thereto a record stabilizer and hold down arm 15 are swingably mounted on the plate 18. The tone arm is provided with the usual pickup head 14*a* having a needle 14*b*** for tracking the record groove.

The tone arm is supported near its base for the usual swinging and up and down movement of the pickup by a support means which is of a chartcter that reduces the friction to a minimum and enables an extremely light pressure to be applied by the needle to the record and still enable good reproduction and permit the run out groove of the record to move the arm quickly to initiate the record change cycle.

The tone arm support includes a shaft 20,, FIGS. 4 and 5, which extends down through a bushing or post 21, FIG. 2, on top of the cover plate and through and below the cover plate. The lower end of the shaft carries a control lever which cooperates with a cam to rotate the shaft for controlling the outward and inward swinging movement of the tone arm as shown and described in detail in said patent. The upper end of the shaft is gripped by a clamp means 22, FIG. 5, which may be made of a suitable plastic and includes a base **22*a* having a keyhole shaped slot 22*b* extending transversely across the base and a clamping screw 22*c*. The clamping screw 22*c* extends loosely through a hole extending between the slot and the edge of the base and is threaded into the body of the base. The screw may be loosened to adjust the base to the desired height and rotational position on the shaft and then clamped by tightening the screw. It is easily reached through an opening 26*a*** in the rear of the tone arm housing, FIG. 4.

Spaced from the base on opposite sides are shoulders **22*d*, and, from the shoulders, the base curves on each side to the apex 22*e***.

A hinge and safety plate 24 is mounted on the base and is so connected to the base that it may be moved manually relative to the base. A headed pin is secured in the base and includes a stem 25 and a head or flange **25*a* which extends above the base in spaced relation thereto. The hinge plate has a triangular opening 24*a* therein through which the headed pin 25 extends with the head overhanging the plate at the edge of the opening. The plate has a pair of downwardly extending flanges 24*b* on opposite side and which extend down on opposite sides of the base and the edges of which engage with the shoulders 22*d* on the base. The plate with the flanges is held against the shoulders by a coil spring 26, one end of which is hooked on an extension 25*b* of the pin 25, which extends above the head 25*a*, and the other end of which is looped over an extension 24*c* of the hinge plate. The tension on the spring causes the flanges 24*a* to be pulled into engagement with the shoulders, the stem 25 of the holding pin 25 being in one of the corners of the opening 24*a*. It will be apparent that the hinge plate may be moved laterally and that one or the other of the flanges 24*b* can rock on the corresponding shoulder 22*d*. The curvature of the base edges from the base to the apex is such that either one of the flanges may move along the arcs defined by the surface leading to the apex. At the same time the shape of the triangular opening 24*a* in the hinge plate is such that when the above rocking movement occurs it allows the plate to move about the pin shank 25 but with the head 25*a*** always overhanging the plate adjacent the edges of the opening and preventing the plate from being dislodged from the base. This is the means whereby any interferences with the tone arm during the change cycle enables the hinge plate to move relative to the base and prevents damage to the mechanism.

The flanges 24*b* on the support plate also provide the support for the tone arm body housing. As best shown in FIGS. 1 and 3, the body housing 28 includes a rear narrow part 28*a* which house and guide a counterweight 29. A cross section of the part 28*a* is of inverted U shape. Between the depending parallel walls the counterweight 29 is supported on an adjusting screw 30, a spring 30*a* being disposed between the end wall 28*b* and the weight, around the screw shank. The weight can be moved longitudinally btween the walls of the body to counterbalance and adjust for the weight of the pickup and hence the pressure exerted by the needle at the end of the tone arm.

The top of the housing 28 may be provided with a longitudinally extending seat, not shown, and the tone arm 14 is rigidly secured to the body 28*a* in the seat in any suitable manner such as by screws, not shown, extending into the tone arm from the underside of the housing. The hinging for the body is well ahead of the extremity of the part 28*a* in the main housing 28, which main housing is of an irregular trapezoidal shape.

As best shown in FIGS. 4 and 5, the side walls 28*c* and 28*d* of the main housing body extend down on opposite sides of the flanges 24*b* of the hinge plate. One wall 28*c* carries a headed pin 31 which has a press fit with an opening in the housing and extends freely through a hole in one of the flanges 24*b*. The hole clearance should allow easy movement of the pin but should not allow undue lateral movement in the opening. The other wall of the housing is provided with a boss 28*e* which has an outer surface parallel to the other wall and into which a hinge screw 32 is threaded. The shank of the screw has a close fit with the housing and is in loose threaded engagement with an opening in the other flange 24*b*. When the body is assembled with the hinge plate, the spacing between the flanges of the hinge plate and the walls of the housing may be determined by holding the housing centered relative to the plate and then threading the screw 32 through the housing and into the flange 24*b*. The housing is free to pivot about the screw 32 and the pin 31, so that the tone arm may move vertically, but it cannot move laterally relative to the plate because of the threaded engagement of the screw. Thus accurate vertical hinging is obtained with a minimum of friction. The pin 31 could also be a screw the same as screw 32, if desired.

As can best be seen from FIG. 3, the pivot line for the tone arm is on the line *x—x* and this line is well ahead of the rear end of the tone arm. Exact counter-balancing of the tone arm with its pickup may be obtained by shifting the weight 29. Thus a needle or stylus pressure of as low as ⅓ gram may be obtained and the pickup arm is still able to follow any undulations that may be in the record.

Having thus described the invention in an embodiment thereof, I am aware that numerous and extensive departures may be made therefrom without departing from the spirit or scope of the invention as claimed in the appended claims.

I claim:

1. A tone arm support for a record changer comprising a shaft, a base member having opposite sides, said base member being secured to said shaft and formed with a pair of shoulders on said opposite sides, a headed pin extending upward from said base intermediate said shoulders, a base plate disposed on said base member and having a pair of projections engaged with said shoulders, said plate being formed with an opening and said headed pin extending through the opening and with the head extending over the plate adjacent the opening and spring means connected between said plate and said pin to hold the plate with the projections resiliently against said shoulders, said opening being of a size larger than the pin whereby when the plate is moved relative to the base member the plate may relatively slide freely around said pin disposd in said opening.

2. A device as described in claim 1, wherein the side walls of said opening provide guide means for said pin restricting the movement of said plate relative to the base.

3. A device as described in claim 1, wherein said base member is formed with a slot and a shaft receiving opening at the end of the slot, screw means extending from the edge through said slot and threaded into the base beyond the slot with the head of the screw engaging the outer edge of the base member to pull the walls of the slot closer together upon tightening of the screw and to reduce the size of the shaft opening.

References Cited

UNITED STATES PATENTS

| | | | |
|---|---|---|---|
| 1,891,369 | 12/1932 | Curtis | 274—23 |
| 2,310,229 | 2/1943 | Gay | 274—23 |
| 2,478,234 | 8/1949 | Cain | 274—23 |
| 3,006,651 | 10/1961 | Burdick et al. | 274—23 |
| 3,051,494 | 8/1962 | Walton | 274—23 |
| 3,228,699 | 1/1966 | Rost | 274—23 |

HARRY N. HAROIAN, *Primary Examiner.*